(12) United States Patent
Yang

(10) Patent No.: US 8,696,328 B2
(45) Date of Patent: Apr. 15, 2014

(54) PHOTOTHERMAL SOURCE OF FLUID PUMPING DEVICE DRIVEN BY SELF PHOTOVOLTAIC POWER

(76) Inventor: Tai-Her Yang, Dzan-Hwa (TW)

( * ) Notice: Subject to any disclaimer, the term of this patent is extended or adjusted under 35 U.S.C. 154(b) by 335 days.

(21) Appl. No.: 12/969,695

(22) Filed: Dec. 16, 2010

(65) Prior Publication Data
US 2012/0156069 A1   Jun. 21, 2012

(51) Int. Cl.
F04B 35/04   (2006.01)
H05K 7/20    (2006.01)

(52) U.S. Cl.
USPC .......................................... 417/411; 361/695

(58) Field of Classification Search
USPC .................................. 417/411; 361/694–696
See application file for complete search history.

(56) References Cited

U.S. PATENT DOCUMENTS

| | | | |
|---|---|---|---|
| 4,090,359 A | 5/1978 | Doellner | |
| 4,665,472 A * | 5/1987 | Chang | 362/294 |
| 4,778,378 A | 10/1988 | Dolnick | |
| 4,974,126 A | 11/1990 | Hwang | |
| 6,050,779 A * | 4/2000 | Nagao et al. | 417/28 |
| 7,638,750 B2 * | 12/2009 | Kline | 250/214 R |
| 7,866,958 B2 * | 1/2011 | Patel | 417/423.1 |
| 2003/0066290 A1 | 4/2003 | Murata | |
| 2004/0130897 A1 * | 7/2004 | Kojima et al. | 362/294 |
| 2006/0285331 A1 | 12/2006 | Wang | |
| 2007/0285920 A1 | 12/2007 | Seabrook | |
| 2008/0049417 A1 | 2/2008 | Shouse | |
| 2010/0060231 A1 * | 3/2010 | Trainor et al. | 320/103 |
| 2010/0312425 A1 * | 12/2010 | Obayashi et al. | 701/22 |

FOREIGN PATENT DOCUMENTS

| | | |
|---|---|---|
| DE | 8907858 U1 | 8/1989 |
| EP | 1186829 A1 | 3/2002 |
| WO | WO 99/07584 * | 2/1999 |

OTHER PUBLICATIONS

European Search Report in corresponding European Application EP11194093.

* cited by examiner

Primary Examiner — Charles Freay
(74) Attorney, Agent, or Firm — Bacon & Thomas, PLLC

(57) ABSTRACT

The present invention relates to a photothermal source of fluid pumping device driven by self photovoltaic power, wherein a light projection space defined adjacent to a photothermal source device generating both optical and thermal power is provided with a photovoltaic (PV) device capable of converting the self optical power of the photothermal source device into the electric power, and a fluid pumping device driven by the electric power supplied by the photovoltaic device is provided for pumping a gaseous or liquid fluid, so that a part or all of the photothermal source device itself, a heat radiator installed on the photothermal source device and a thermal space heated by the photothermal source device can perform the operation of thermal energy transmission.

29 Claims, 4 Drawing Sheets

PHOTOTHERMAL SOURCE OF FLUID PUMPING DEVICE DRIVEN BY SELF PHOTOVOLTAIC POWER

BACKGROUND OF THE INVENTION (a) Field of the Invention

The present invention relates to a photothermal source of fluid pumping device driven by self photovoltaic power, wherein a light projection space defined adjacent to a photothermal source device generating both optical and thermal power is provided with a photovoltaic (PV) device capable of converting the self optical power of the photothermal source device into the electric power, and a fluid pumping device driven by the electric power supplied by the photovoltaic device is provided for pumping the gaseous or liquid fluid, so that a part or all of the photothermal source device itself, a heat radiator installed on the photothermal source device and a thermal space heated by the photothermal source device can perform the operation of thermal energy transmission.

(b) Description of the Prior Art

A conventional photothermal source device is often equipped with a property of generating both optical and thermal power, e.g. a LED driven by electric power, a light-emitting device of gas lamp tube or an electrothermal light-emitting device of electric heating wire, when being electrically charged for emitting light, thermal lose would be generated and temperature is therefore increased, so the service life of lamp device is affected and the efficiency of converting electric power into optical power is reduced, such disadvantage is often compensated by installing a large-scale heat dissipation device; as for a combustion type light-emitting device, the generated heat would also cause some disadvantages, and a photothermal source electric heating device utilizing a quartz lamp tube capable of generating both thermal and optical power or a fuel combustion heater that emits light through combustion or a combustion type photothermal source has to be installed with a fluid pumping device driven by electric power generated by an electric source so as to pump out the gaseous thermal fluid for transmitting thermal power, or to pump in combustion assisting air flow, but the shortage thereof is that the cost is raised and external electric power has to be introduced which increases the electric power consumption.

SUMMARY OF THE INVENTION

The present invention provides a photothermal source of fluid pumping device driven by self photovoltaic power, wherein a light projection space defined adjacent to a photothermal source device generating both optical and thermal power is provided with a photovoltaic (PV) device capable of converting the self optical power of the photothermal source device into the electric power, and a fluid pumping device driven by the electric power supplied by the photovoltaic device is provided for pumping the gaseous or liquid fluid, so that a part or all of the photothermal source device itself, a heat radiator installed on the photothermal source device and a thermal space heated by the photothermal source device can perform the operation of thermal power transmission.

According to the present invention of the photothermal source of fluid pumping device driven by self photovoltaic power, through installing a photovoltaic device which converts the optical power into the electric power, the optical power of residual light of the photothermal source device generating both optical and thermal power is converted into electric power for driving a fluid pumping device, thus external power is not needed to be introduced so as to save electric power and safety can be ensured, and capable of being synchronously operated with the photothermal source device, so when adopted in a lamp generating both optical and thermal power, the fluid pumping device can be driven by the electric power of the photovoltaic device, so the temperature of the photothermal source device is lowered through the pumped gaseous fluid or the pumped liquid fluid, so the efficiency of electric power converting into optical power is increased and the lamp service life is prolonged; when adopted in a kerosene heater or combustion type photothermal source or electric heater with property of self generating both thermal and optical power, through installing the photovoltaic device for converting optical power to electric power, the thermal source device itself and the optical power generated with the thermal power is converted into electric power, and the electric power is served to drive the fluid pumping device, so for a part or all of the thermal source device or a heat radiator installed thereon or a thermal space heated by the thermal source device, the gaseous or liquid thermal fluid can be pumped out for transmitting thermal power or pumped in combustion assisting gaseous fluid, as such external electric power is not needed to be introduced so as to save electric power and safety can be ensured, and capable of being synchronously operated with the thermal source device, so the efficiency of heat dissipation is increased and cost is saved and less electric power is consumed.

DESCRIPTION OF MAIN COMPONENT SYMBOLS

Figure 1:
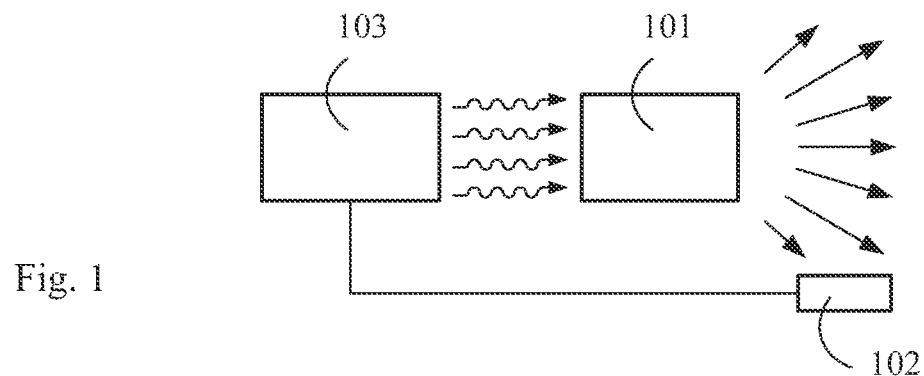
FIG. 1 is a schematic view showing the structural theory according to the present invention.

EM100: Electric motor
101: Photothermal source device
1011: Fluid pump
1012: Air flow fan device
1013: Heat dissipater
1014: Fluid pipeline
1015: Fluid type heat exchange device
1016: Fluid storage and heat dissipation device
1019: Light-pervious heat insulation device
1020: Light-pervious heat insulation device combined on photovoltaic (PV) device
102: Photovoltaic (PV) device
1021: Electromagnetically-vibrated type fluid pump
1022: Electromagnetically-vibrated type air flow pump
103: Fluid pumping device assembly
1031: Electric motor driven fluid pumping device
1032: Electric motor driven air flow fan device

DETAILED DESCRIPTION OF THE PREFERRED EMBODIMENTS

A conventional photothermal source device is often equipped with a property of generating both optical and thermal power, e.g. a LED driven by electric power, a light-emitting device of gas lamp tube or an electrothermal light-emitting device of electric heating wire, when being electrically charged for emitting light, thermal lose would be generated and temperature is therefore increased, so the service life of lamp device is affected and the efficiency of converting electric power into optical power is reduced, such disadvantage is often compensated by installing a large-scale heat dissipation device; as for a combustion type light-emitting device, the generated heat would also cause some disadvantages, and a photothermal source electric heating device utilizing a quartz lamp tube capable of generating both thermal and optical power or a fuel combustion heater that emits light through combustion or a combustion type photothermal source has to be installed with a fluid pumping device driven by electric power generated by an electric source so as to pump out the gaseous thermal fluid for transmitting thermal power, or to pump in combustion assisting air flow, but the shortage thereof is that the cost is raised and external electric power has to be introduced which increases the electric power consumption.

The present invention relates to a photothermal source of fluid pumping device driven by self photovoltaic power, wherein a light projection space defined adjacent to a photothermal source device generating both optical and thermal power is provided with a photovoltaic (PV) device capable of converting the self optical power of the photothermal source device into the electric power, and a fluid pumping device driven by the electric power supplied by the photovoltaic device is provided for pumping the gaseous or liquid fluid, so that a part or all of the photothermal source device itself, a heat radiator installed on the photothermal source device and a thermal space heated by the photothermal source device can perform the operation of thermal power transmission;

According to the present invention of the photothermal source of fluid pumping device driven by self photovoltaic power, through installing a photovoltaic device which converts the optical power into the electric power, the optical power of residual light of the photothermal source device generating both optical and thermal power is converted into electric power for driving a fluid pumping device, thus external power is not needed to be introduced so as to save electric power and safety can be ensured, and capable of being synchronously operated with the photothermal source device, so when adopted in a lamp generating both optical and thermal power, the fluid pumping device can be driven by the electric power of the photovoltaic device, so the temperature of the photothermal source device is lowered through the pumped gaseous fluid or the pumped liquid fluid, so the efficiency of electric power converting into optical power is increased and the lamp service life is prolonged; when adopted in a kerosene heater or combustion type photothermal source or electric heater with property of self generating both thermal and optical power, through installing the photovoltaic device for converting optical power to electric power, the thermal source device itself and the optical power generated with the thermal power is converted into electric power, and the electric power is served to drive the fluid pumping device, so for a part or all of the thermal source device or a heat radiator installed thereon or a thermal space heated by the thermal source device, the gaseous or liquid thermal fluid can be pumped out for transmitting thermal power or pumped in combustion assisting gaseous fluid, as such external electric power is not needed to be introduced so as to save electric power and safety can be ensured, and capable of being synchronously operated with the thermal source device, so the efficiency of heat dissipation is increased and cost is saved and less electric power is consumed.

As shown in FIG. 1, which is a schematic view showing the structural theory according to the present invention, which is a photothermal source of fluid pumping device driven by self photovoltaic power, and it mainly consists of:

Photothermal source device (101): constituted by a lamp device with the property of self generating both optical and thermal power, e.g. an electrically-driven LED in a lamp, an arc light-emitting device, a light-emitting device of gas lamp tube or a light-emitting device of electrical heating filament; or constituted by a photothermal source device generating both optical and thermal power through combustion; or constituted by a kerosene heater or combustion type photothermal source capable of synchronously generating both thermal and optical power or electric heater generating thermal and optical power through being electrically charged;

Photovoltaic device (102): constituted by a conversion device capable of converting the optical power of the photothermal source device (101) into the electric power, e.g. a photovoltaic (PV) device for converting optical power into electric power, so the electric power converted from the optical power of the photothermal source device (101) can be used to drive a fluid pumping device assembly (103) for pumping a gaseous or liquid fluid;

Fluid pumping device assembly (103): constituted by a fluid pumping device capable of converting the electric power output by the photovoltaic device (102) into the mechanical power, for pumping the gaseous or liquid fluid passing through the photothermal source device (101) for assisting the photothermal source device (101) to transmit thermal energy to the exterior.

Figure 2:
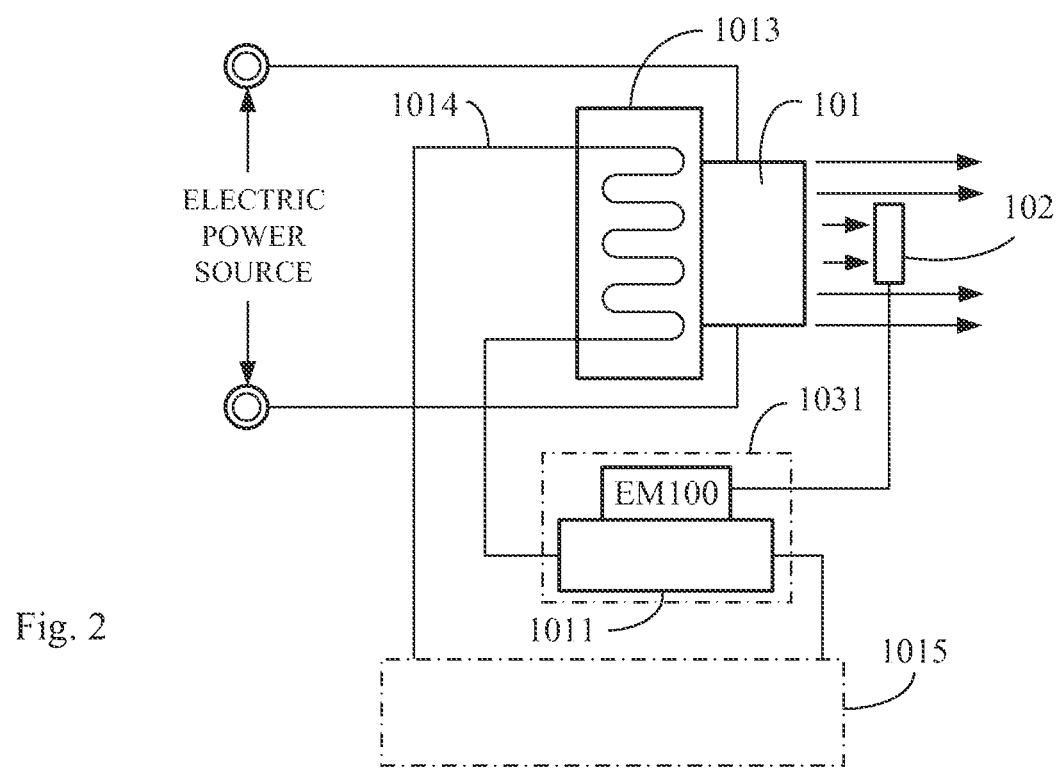
FIG. 2 is a schematic structural view showing the fluid pump (1011) driven by an electric motor being served to pump the liquid fluid in the fluid type heat exchange device (1015) to pass through the fluid pipeline (1014) and the heat radiator (1013) then back to the fluid type heat exchange device (1015), so the thermal power transmission between the heat radiator (1013) and the fluid type heat exchange device (1015) being performed, according to the present invention.

FIG. 2 is a schematic structural view showing the fluid pump (1011) driven by an electric motor being served to pump the liquid fluid in the fluid type heat exchange device (1015) to pass through the fluid pipeline (1014) and the heat radiator (1013) then back to the fluid type heat exchange device (1015), thereby performing thermal energy transmission between the heat radiator (1013) and the fluid type heat exchange device (1015), according to the present invention; as shown in FIG. 2, and it mainly consists of:

Photothermal source device (101): constituted by a lamp device with the property of self generating both optical and thermal power, e.g. an electrically-driven LED in a lamp, an arc light-emitting device, a light-emitting device of gas lamp tube or a light-emitting device of electrical heating filament; or constituted by a photothermal source device generating both optical and thermal power through combustion; or constituted by a kerosene heater or combustion type photothermal source capable of synchronously generating both thermal and optical power or electric heater generating thermal and optical power through being electrically charged;

Photovoltaic device (102): constituted by a conversion device capable of converting the optical power of the photothermal source device (101) into the electric power, e.g. a photovoltaic (PV) device for converting optical power into electric power, so the electric power converted from the optical power of the photothermal source device (101) can be used to drive an electric motor driven fluid pumping device (1031) for pumping a gaseous or liquid fluid;

Electric motor driven fluid pumping device (1031): constituted by an electric motor (EM100) and a fluid pump (1011) driven thereby, and is driven by the electric power output by the photovoltaic device (102), for pumping the liquid fluid in the fluid type heat exchange device (1015) to pass through the fluid pipeline (1014) and the heat radiator (1013) then back to the fluid type heat exchange device (1015), thereby performing thermal energy transmission between the heat radiator (1013) and the fluid type heat exchange device (1015);

Fluid type heat exchange device (1015): made of a heat conductive material and having a fluid path allowing the gaseous or liquid fluid pumped by the electric motor driven fluid pumping device (1031) to pass through for assisting the photothermal source device (101) exchange heat with the exterior.

Figure 3:
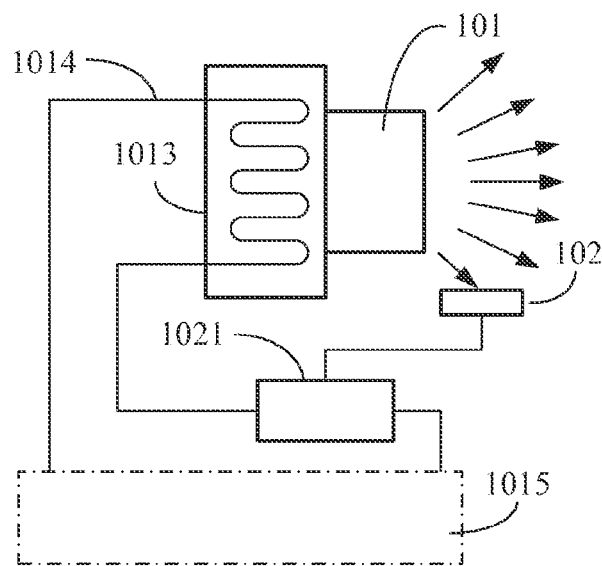
FIG. 3 is a schematic structural view showing the electromagnetically-vibrated type liquid fluid pump (1021) being served to pump the liquid fluid in the fluid type heat exchange device (1015) to pass through the fluid pipeline (1014) and the heat radiator (1013) then back to the fluid type heat exchange device (1015), so the thermal power transmission between the heat radiator (1013) and the fluid type heat exchange device (1015) being performed, according to the present invention.

FIG. 3 is a schematic structural view showing the electromagnetically-vibrated type liquid fluid pump (1021) being served to pump the liquid fluid in the fluid type heat exchange device (1015) to pass through the fluid pipeline (1014) and the heat radiator (1013) then back to the fluid type heat exchange device (1015), thereby performing the thermal energy transmission between the heat radiator (1013) and the fluid type heat exchange device (1015), according to the present invention; as shown in FIG. 3, it mainly consists of:

Photothermal source device (101): constituted by a lamp device with the property of self generating both optical and thermal power, e.g. an electrically-driven LED in a lamp, an arc light-emitting device, a light-emitting device of gas lamp tube or a light-emitting device of electrical heating filament; or constituted by a photothermal source device generating both optical and thermal power through combustion; or constituted by a kerosene heater or combustion type photothermal source capable of synchronously generating both thermal and optical power or electric heater generating thermal and optical power through being electrically charged;

Photovoltaic device (102): constituted by a conversion device capable of converting the optical power of the photothermal source device (101) into the electric power, e.g. a photovoltaic (PV) device for converting optical power into electric power, so the electric power converted from the optical power of the photothermal source device (101) can be used to drive an electromagnetically-vibrated type liquid fluid pump (1021) for pumping a gaseous or liquid fluid;

Electromagnetically-vibrated type liquid fluid pump (1021): constituted by a fluid pump having electromagnetic coils allowing magnetic excitation for performing reciprocal driving, and is driven by the electric power output by the photovoltaic device (102), for pumping the liquid fluid in the fluid type heat exchange device (1015) to pass through the fluid pipeline (1014) and the heat radiator (1013) then back to the fluid type heat exchange device (1015), thereby performing the thermal energy transmission between the heat radiator (1013) and the fluid type heat exchange device (1015);

Fluid type heat exchange device (1015): made of a heat conductive material and having a fluid path allowing the gaseous or liquid fluid pumped by the electromagnetically-vibrated type liquid fluid pump (1021) to pass through for assisting the photothermal source device (101) exchange heat with the exterior.

Figure 4:
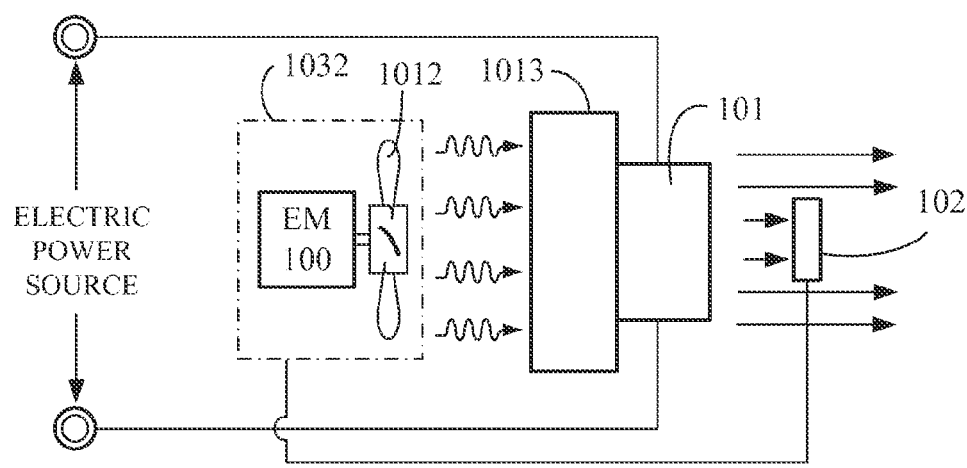
FIG. 4 is a schematic structural view showing the electric motor driven gaseous fluid fan device (1032) being served to pump the gaseous fluid for assisting the heat dissipation of the photothermal source device, according to the present invention.

FIG. 4 is a schematic structural view showing the electric motor driven gaseous fluid fan device (1032) being served to pump the gaseous fluid for assisting the heat dissipation of the photothermal source device, according to the present invention; as shown in FIG. 4, it mainly consists of:

Photothermal source device (101): constituted by a lamp device with the property of self generating both optical and thermal power, e.g. an electrically-driven LED in a lamp, an arc light-emitting device, a light-emitting device of gas lamp tube or a light-emitting device of electrical heating filament; or constituted by a photothermal source device generating both optical and thermal power through combustion; or constituted by a kerosene heater or combustion type photothermal source capable of synchronously generating both thermal and optical power or electric heater generating thermal and optical power through being electrically charged;

Photovoltaic device (102): constituted by a conversion device capable of converting the optical power of the photothermal source device (101) into the electric power, e.g. a photovoltaic (PV) device for converting optical power into electric power, so the electric power converted from the optical power of the photothermal source device (101) can be used to drive an electric motor driven gaseous fluid fan device (1032) for pumping a gaseous or liquid fluid;

Electric motor driven gaseous fluid fan device (1032): constituted by a gaseous fluid fan device (1012) driven by the electric motor (EM100), and driven by the electric power output by the photovoltaic device (102) for pumping the gaseous fluid to pass through a part or all of the photothermal source device (101), the heat radiator installed thereon and the thermal space heated by the photothermal source device (101) for assisting the heat dissipation of the photothermal source device (101).

Figure 5:
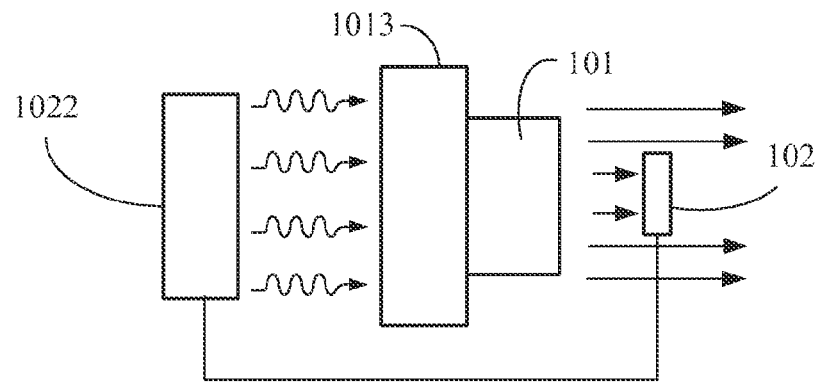
FIG. 5 is a schematic structural view showing the electromagnetically-vibrated type gaseous fluid pump (1022) being served to pump the gaseous fluid for assisting the heat dissipation of the photothermal source device, according to the present invention.

FIG. 5 is a schematic structural view showing the electromagnetically-vibrated type gaseous fluid pump (1022) being served to pump the gaseous fluid for assisting the heat dissipation of the photothermal source device, according to the present invention; as shown in FIG. 5, it mainly consists of:

Photothermal source device (101): constituted by a lamp device with the property of self generating both optical and thermal power, e.g. an electrically-driven LED in a lamp, an arc light-emitting device, a light-emitting device of gas lamp tube or a light-emitting device of electrical heating filament; or constituted by a photothermal source device generating both optical and thermal power through combustion; or constituted by a kerosene heater or combustion type photothermal source capable of synchronously generating both thermal and optical power or electric heater generating thermal and optical power through being electrically charged;

Photovoltaic device (102): constituted by a conversion device capable of converting the optical power of the photothermal source device (101) into the electric power, e.g. a photovoltaic (PV) device for converting optical power into electric power, so the electric power converted from the optical power of the photothermal source device (101) can be used to drive an electromagnetically-vibrated type gaseous fluid pump (1022) for pumping a gaseous or liquid fluid;

Electromagnetically-vibrated type gaseous fluid pump (1022): constituted by a gaseous fluid pump having electromagnetic coils allowing magnetic excitation for performing reciprocal driving, and driven by the electric power output by the photovoltaic device (102) for pumping the gaseous fluid to pass through a part or all of the photothermal source device (101), the heat radiator installed thereon and the thermal space heated by the photothermal source device (101) for assisting the heat dissipation of the photothermal source device (101).

Figure 6:
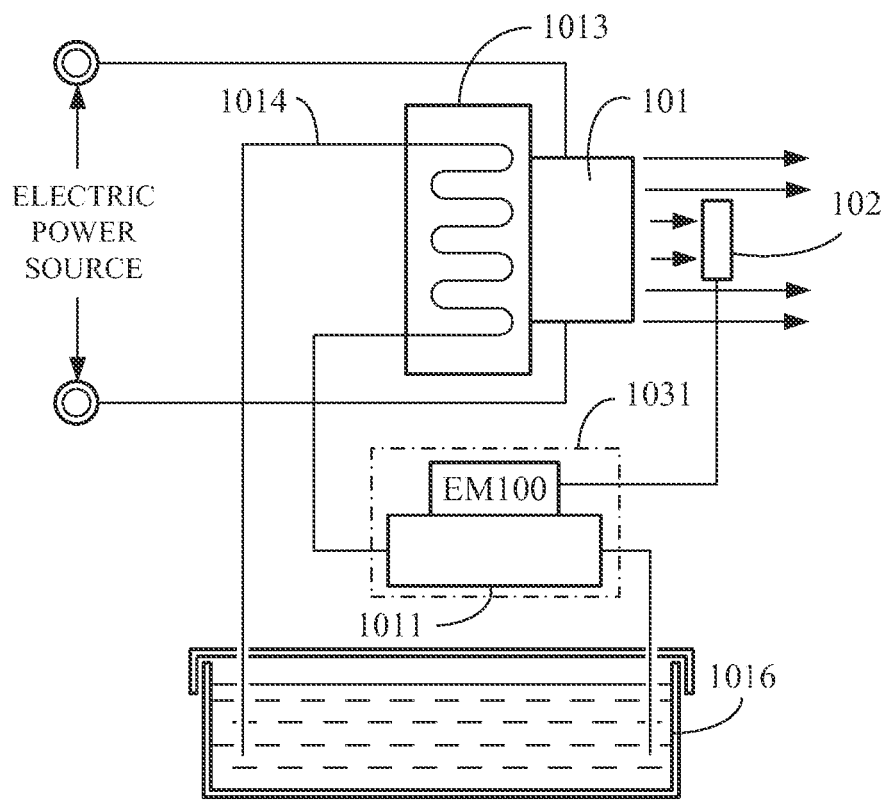
FIG. 6 is a schematic structural view showing the fluid pump (1011) driven by the electric motor being served to pump the liquid fluid in the fluid storage and heat dissipation device (1016) to pass through the fluid pipeline (1014) and the heat radiator (1013) then back to the fluid storage and heat dissipation device (1016), so the thermal power transmission between the heat radiator (1013) and the fluid storage and heat dissipation device (1016) being performed, according to the present invention.

FIG. 6 is a schematic structural view showing the fluid pump (1011) driven by the electric motor being served to pump the liquid fluid in the fluid storage and heat dissipation device (1016) to pass through the fluid pipeline (1014) and the heat radiator (1013) then back to the fluid storage and heat dissipation device (1016), thereby performing the thermal energy transmission between the heat radiator (1013) and the fluid storage and heat dissipation device (1016), according to the present invention; as shown in FIG. 6, it mainly consists of:

Photothermal source device (101): constituted by a lamp device with the property of self generating both optical and thermal power, e.g. an electrically-driven LED in a lamp, an arc light-emitting device, a light-emitting device of gas lamp tube or a light-emitting device of electrical heating filament; or constituted by a photothermal source device generating both optical and thermal power through combustion; or constituted by a kerosene heater or combustion type photothermal source capable of synchronously generating both thermal and optical power or electric heater generating thermal and optical power through being electrically charged;

Photovoltaic device (102): constituted by a conversion device capable of converting the optical power of the photothermal source device (101) into the electric power, e.g. a photovoltaic (PV) device for converting optical power into electric power, so the electric power converted from the optical power of the photothermal source device (101) can be used to drive an electric motor driven fluid pumping device (1031) for pumping a gaseous or liquid fluid;

Electric motor driven fluid pumping device (1031): constituted by an electric motor (EM100) and a fluid pump (1011) driven thereby, and is driven by the electric power output by the photovoltaic device (102), for pumping the liquid fluid in the fluid storage and heat dissipation device (1016) to pass through the fluid pipeline (1014) and the heat radiator (1013) then back to the fluid storage and heat dissipation device (1016), thereby performing the thermal energy transmission between the heat radiator (1013) and the fluid storage and heat dissipation device (1016);

Fluid storage and heat dissipation device (1016): which is a container structure for storing liquid fluid, the liquid fluid stored in the fluid storage and heat dissipation device (1016) is pumped by the electric motor driven fluid pumping device (1031) to pass through the fluid pipeline (1014) and the heat radiator (1013) then back to the fluid storage and heat exchange device (1016); the fluid storage and heat dissipation device (1016) is made of a thermal conductive or non-thermal conductive material and is configured in a closed or opened structure or equipped with a protection cover which can be opened/closed.

Figure 7:
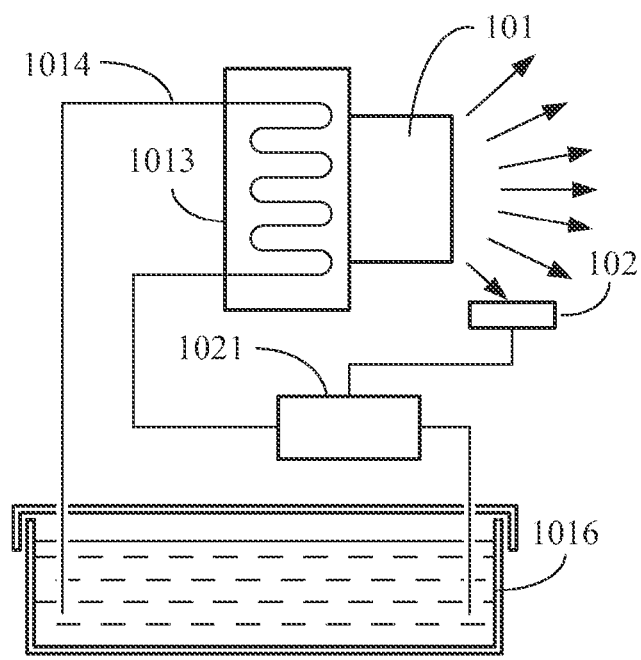
FIG. 7 is a schematic structural view showing the electromagnetically-vibrated type liquid fluid pump (1021) being served to pump the liquid fluid in the fluid storage and heat dissipation device (1016) to pass through the fluid pipeline (1014) and the heat radiator (1013) then back to the fluid storage and heat dissipation device (1016), so the thermal power transmission between the heat radiator (1013) and the fluid storage and heat dissipation device (1016) being performed, according to the present invention.

FIG. 7 is a schematic structural view showing the electromagnetically-vibrated type liquid fluid pump (1021) being served to pump the liquid fluid in the fluid storage and heat dissipation device (1016) to pass through the fluid pipeline (1014) and the heat radiator (1013) then back to the fluid storage and heat dissipation device (1016), thereby performing the thermal energy transmission between the heat radiator (1013) and the fluid storage and heat dissipation device (1016), according to the present invention; as shown in FIG. 7, it mainly consists of:

Photothermal source device (101): constituted by a lamp device with the property of self generating both optical and thermal power, e.g. an electrically-driven LED in a lamp, an arc light-emitting device, a light-emitting device of gas lamp tube or a light-emitting device of electrical heating filament; or constituted by a photothermal source device generating both optical and thermal power through combustion; or constituted by a kerosene heater or combustion type photothermal source capable of synchronously generating both thermal and optical power or electric heater generating thermal and optical power through being electrically charged;

Photovoltaic device (102): constituted by a conversion device capable of converting the optical power of the photothermal source device (101) into the electric power, e.g. a photovoltaic (PV) device for converting optical power into electric power, so the electric power converted from the optical power of the photothermal source device (101) can be used to drive an electromagnetically-vibrated type liquid fluid pump (1021) for pumping a gaseous or liquid fluid;

Electromagnetically-vibrated type liquid fluid pump (1021): constituted by a fluid pump having electromagnetic coils allowing magnetic excitation for performing reciprocal driving, and is driven by the electric power output by the photovoltaic device (102), for pumping the liquid fluid in the fluid storage and heat dissipation device (1016) to pass through the fluid pipeline (1014) and the heat radiator (1013) then back to the fluid storage and heat dissipation device (1016), thereby performing the thermal energy transmission between the heat radiator (1013) and the fluid storage and heat dissipation device (1016);

Fluid storage and heat dissipation device (1016): which is a container structure for storing liquid fluid, the liquid fluid stored in the fluid storage and heat dissipation device (1016) is pumped by the electromagnetically-vibrated type liquid fluid pump (1021) to pass through the fluid pipeline (1014) and the heat radiator (1013) then back to the fluid storage and heat exchange device (1016); the fluid storage and heat dissipation device (1016) is made of a thermal conductive or non-thermal conductive material and is configured in a closed or opened structure or equipped with a protection cover which can be opened/closed.

Figure 8:
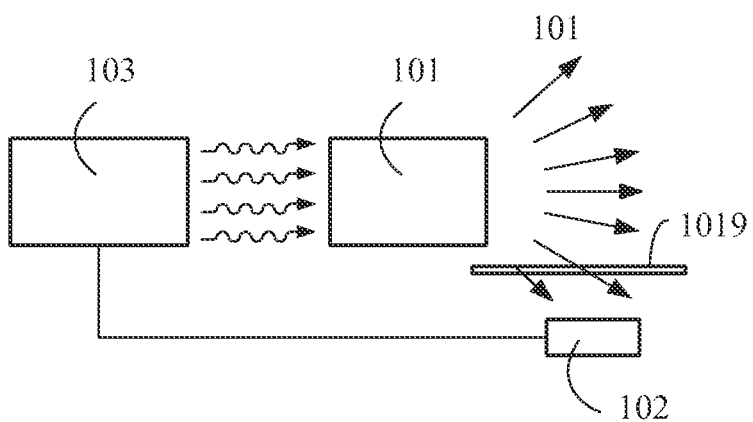
FIG. 8 is a schematic structural view showing the light-pervious heat insulation device (1019) being installed between the photothermal source device (101) and the photovoltaic device (102), according to the present invention.

According to the present invention of the photothermal source of fluid pumping device driven by self photovoltaic power, for preventing the photovoltaic device (102) being overly heated due to disposed close to the photothermal source device (101), a light-pervious heat insulation device (1019) can be further installed between the photovoltaic device (102) and the photothermal source device (101), for protecting the photovoltaic device (102) from being overly heated;

FIG. 8 is a schematic structural view showing the light-pervious heat insulation device (1019) being installed between the photothermal source device (101) and the photovoltaic device (102), according to the present invention;

As shown in FIG. 8, the photothermal source of fluid pumping device driven by self photovoltaic power is further installed with a light-pervious heat insulation device (1019) between the photothermal source device (101) and the photovoltaic device (102), for preventing the photovoltaic device (102) from being damaged by the overly high temperature from the photothermal source device (101) or lowering the operation performance of the photovoltaic device (102).

Figure 9:
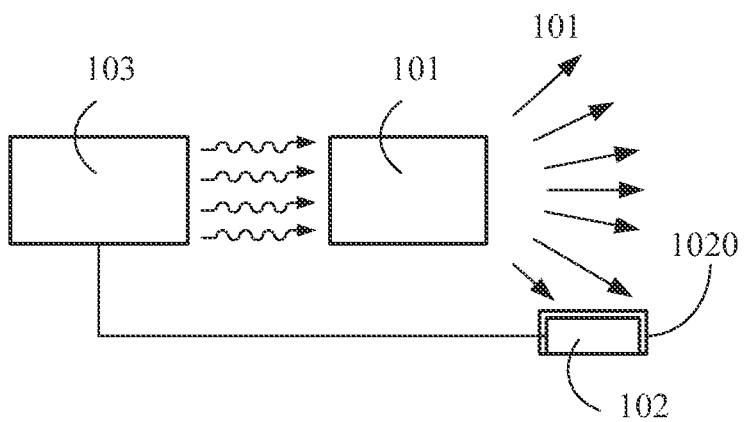
FIG. 9 is a schematic structural view showing the photovoltaic device (102) being installed with the light-pervious heat insulation device (1020), according to the present invention.

According to the present invention of the photothermal source of fluid pumping device driven by self photovoltaic power, for preventing the photovoltaic device (102) being overly heated due to disposed close to the photothermal source device (101), a light-pervious heat insulation device combined on photovoltaic device (1020) is installed on the light receiving surface of the photovoltaic device (102), for protecting the photovoltaic device (102) from being overly heated;

FIG. 9 is a schematic structural view showing the photovoltaic device (102) being installed with the light-pervious heat insulation device (1020), according to the present invention;

As shown in FIG. 9, in the photothermal source of fluid pumping device driven by self photovoltaic power, a light-pervious heat insulation device combined with the photovoltaic device (1020) is installed on the light receiving surface of the photovoltaic device (102), for preventing the photovoltaic device (102) from being damaged by the overly high temperature from the photothermal source device (101) or lowering the operation performance of the photovoltaic device (102).

According to the present invention of the photothermal source of fluid pumping device driven by self photovoltaic power, the fluid pumping device assembly (103) includes the heat radiator (1013) installed in the photothermal source device (101).

According to the present invention of the photothermal source of fluid pumping device driven by self photovoltaic power, the fluid pumping device assembly (103) includes a housing installed on the photothermal source device (101) and/or the heat radiator (1013).

According to the present invention of the photothermal source of fluid pumping device driven by self photovoltaic power, the fluid pumping device assembly (103) is individually installed.

According to the present invention of the photothermal source of fluid pumping device driven by self photovoltaic power, the fluid pumping device assembly (103) includes the electric motor driven fluid pumping device (1031) for pumping the liquid fluid to pass through the heat radiator (1013) and the pipeline (1014) and the fluid type heat exchange device (1015) exchanging heat with the exterior, then back to the heat radiator (1013) so as to form a fluid loop and exchange heat with the exterior.

According to the present invention of the photothermal source of fluid pumping device driven by self photovoltaic power, the fluid pumping device assembly (103) includes the electromagnetically-vibrated type liquid fluid pump (1021) for driving the liquid fluid with a vibrating movement means to pump the liquid fluid to pass through the heat radiator (1013) and the pipeline (1014) and the fluid type heat exchange device (1015) exchanging heat with the exterior, then back to the heat radiator (1013) so as to form a fluid loop and exchange heat with the exterior.

According to the present invention of the photothermal source of fluid pumping device driven by self photovoltaic power, the fluid pumping device assembly (103) includes the electromagnetically-vibrated type gaseous fluid pump (1022) for driving the gaseous fluid with the periodical vibration power.

According to the present invention of the photothermal source of fluid pumping device driven by self photovoltaic power, the fluid pumping device assembly (103) includes the electric motor driven gaseous fluid fan device (1032) for driving the gaseous fluid.

According to the present invention of the photothermal source of fluid pumping device driven by self photovoltaic power, the fluid pumping device assembly (103) includes the electromagnetically-vibrated type liquid fluid pump (1021) for driving the liquid fluid with a vibrating movement means to pump the liquid fluid to pass through the heat radiator (1013) and the pipeline (1014) and the fluid storage and heat exchange device (1016) exchanging heat with the exterior, then back to the heat radiator (1013) so as to form a fluid loop and exchange heat with the exterior.

According to the present invention of the photothermal source of fluid pumping device driven by self photovoltaic power, the fluid pumping device assembly (103) includes the electric motor driven fluid pumping device (1031) for pumping the liquid fluid to pass through the heat radiator (1013) and the pipeline (1014) and the fluid storage and heat exchange device (1016) exchanging heat with the exterior, then back to the heat radiator (1013) so as to form a fluid loop and exchange heat with the exterior.

According to the present invention of the photothermal source of fluid pumping device driven by self photovoltaic power, the fluid pumping device assembly (103) driven by the electric power from the photovoltaic device (102) for inputting the external gaseous or liquid fluid having relatively lower temperature to the photothermal source device (101) or the heat radiator (1013) installed thereon and the thermal space heated by the photothermal source device (101), so a part or all of the photothermal source device (101) and the heat radiator installed thereon and the space heated by the photothermal source device (101) can dissipate heat for achieving an effect of lowering temperature.

According to the present invention of the photothermal source of fluid pumping device driven by self photovoltaic power, the fluid pumping device assembly (103) driven by the electric power from the photovoltaic device (102) includes pumping the gaseous fluid so that the thermal energy of the photothermal source device (101) is radiated towards a certain direction.

According to the present invention of the photothermal source of fluid pumping device driven by self photovoltaic power, the fluid pumped by the fluid pumping device assembly (103) driven by self photovoltaic power includes gas and liquid.

According to the present invention of the photothermal source of fluid pumping device driven by self photovoltaic power, the fluid pumping device assembly (103) driven by the electric power from the photovoltaic device (102) includes an electromagnetically-vibrated type liquid fluid pump, or a rotation type fluid pump or piston type fluid pump driven by the electric motor, or a blade type fluid pump rotationally propelling driven by the electric motor.

According to the present invention, the photothermal source of fluid pumping device driven by self photovoltaic power includes being applied to a photothermal source device (101) synchronously generating both optical and thermal power through inputting electric power, such as an electrically-driven LED lamp, a gas lamp, a mercury lamp, an electric heating filament type lamp bulb, or a combustion type light-emitting device, wherein the generated fluid having relatively high temperature can be pumped out through the operation of the fluid pumping device assembly (103) for assisting heat dissipation.

According to the present invention, the photothermal source of fluid pumping device driven by self photovoltaic power includes pumping the fluid having relatively low temperature through the fluid pumping device assembly (103) to a part or all of the photothermal source device (101), the heat radiator (1013) of the photothermal source device (101) and the thermal space heated by the photothermal source device (101), for achieving an effect of lowering temperature.

According to the present invention, the photothermal source of fluid pumping device driven by self photovoltaic power includes pumping the fluid having relatively high temperature through the fluid pumping device assembly (103) to a part or all of the photothermal source device (101), the heat radiator (1013) of the photothermal source device (101) and the thermal space heated by the photothermal source device (101) for a purpose of heating so the photothermal source device (101) is prevented from being at an overly low temperature.

According to the present invention, the photothermal source of fluid pumping device driven by self photovoltaic power includes a fuel combustion heater or combustion type photothermal source generating both thermal and optical power during operation, or an electric heater generating both thermal and optical power while being electrically charged, and the generated thermal energy is pumped out through the operation of the fluid pumping device assembly (103) for outputting the thermal energy.

According to the present invention, the photothermal source of fluid pumping device driven by self photovoltaic power includes being used in a combustion type photothermal source in which combustion assisting gas fluid is introduced from the exterior.

The invention claimed is:

1. A photothermal device arrangement, comprising:
a photothermal source device (101) that generates both light and thermal energy;
a photovoltaic device (102) that converts light emitted by the photothermal source device (101) into electrical power;
a fluid pumping device assembly (103, 1031, or 1032) driven by electrical power from the photovoltaic device (102) for pumping a fluid through the photothermal source device (101) to assist in dissipating the thermal energy generated by the photothermal source device (101).

2. A photothermal device arrangement as claimed in claim 1, wherein the fluid pumping device assembly (103, 1031, 1032) pumps the fluid through a heat radiator (1013) installed on the photothermal source device (101).

3. A photothermal device arrangement as claimed in claim 1, wherein the fluid pumped by the fluid pumping device is one of a gas, a liquid, and a fluid that includes both a gas and a liquid.

4. A photothermal device arrangement as claimed in claim 1, wherein the photothermal source device (101) includes one of an LED in a lamp; an arc light device; a gas lamp tube; an electrical heating filament; a device that generates light and thermal energy by combustion; a kerosene heater, and an electric heater.

5. A photothermal device arrangement as claimed in claim 1, wherein the fluid pumping device assembly (1031) includes a fluid pump (1011) driven by an electric motor (EM100) supplied with electricity from the photovoltaic device (102).

6. A photothermal device arrangement as claimed in claim 5, wherein the fluid pump (1011) pumps the fluid through a fluid type heat exchange device (1015), a fluid pipeline (1014), and a heat radiator (1013) installed on the photothermal source device (101).

7. A photothermal device arrangement as claimed in claim 6, wherein the fluid type heat exchange device (1015) exchanges heat with an exterior of the photothermal fluid pumping device and forms a closed loop with the fluid pump (1011), the fluid pipeline (1014), and the heat radiator (1013).

8. A photothermal device arrangement as claimed in claim 1, wherein the fluid pumping device assembly (103) includes an electromagnetically-vibrated liquid fluid pump (1021) driven by electromagnetic coils supplied with electricity from the photovoltaic device (102).

9. A photothermal device arrangement as claimed in claim 8, wherein the electromagnetically-vibrated liquid fluid pump (1021) pumps the fluid through a fluid type heat exchange device (1015), a fluid pipeline (1014), and a heat radiator (1013) installed on the photothermal source device (101).

10. A photothermal device arrangement as claimed in claim 9, wherein the fluid type heat exchange device (1015) exchanges heat with an exterior of the photothermal fluid pumping device and forms a closed loop with the electromagnetically-vibrated fluid pump (1021), the fluid pipeline (1014), and the heat radiator (1013).

11. A photothermal device arrangement as claimed in claim 1, wherein the fluid pumping device assembly (1032) includes a gaseous fluid pumping fan (1012) driven by an electric motor (EM100) supplied with electricity from the photovoltaic device (102).

12. A photothermal device arrangement as claimed in claim 11, wherein the gaseous fluid pumping fan (1012) pumps the fluid through a fluid type heat exchange device (1015), a fluid pipeline (1014), and a heat radiator (1013) installed on the photothermal source device (101).

13. A photothermal device arrangement as claimed in claim 1, wherein the fluid pumping device assembly (103) includes an electromagnetically-vibrated gaseous fluid pump (1022) driven by at least one electromagnetic coil supplied with electricity from the photovoltaic device (102).

14. A photothermal device arrangement as claimed in claim 13, wherein the electromagnetically-vibrated gaseous fluid pump (1022) pumps the fluid through a fluid type heat exchange device (1015), a fluid pipeline (1014), and a heat radiator (1013) installed on the photothermal source device (101).

15. A photothermal device arrangement as claimed in claim 1, wherein the fluid pumping device assembly (1031) includes a fluid pump (1011) driven by an electric motor (EM100) supplied with electricity from the photovoltaic device (102) to pump the fluid from a fluid storage and heat dissipation device (1016) through a fluid pipeline (1014) to a heat radiator (1013) installed on the photothermal source device (101) and then back to the fluid storage and heat dissipation device (1016).

16. A photothermal device arrangement as claimed in claim 1, wherein the fluid pumping device assembly (103) includes an electromagnetically-vibrated liquid fluid pump (1021) driven by at least one electromagnetic coil supplied with electricity from the photovoltaic device (102) to pump the fluid from a fluid storage and heat dissipation device (1016) through a fluid pipeline (1014) to a heat radiator (1013) installed on the photothermal source device (101) and then back to the fluid storage and heat dissipation device (1016).

17. A photothermal device arrangement as claimed in claim 1, further comprising a light transmitting heat insulation device (1019) between the photothermal source device (101) and the photovoltaic device (102) for protecting the photovoltaic device (102) from damage or decreased performance caused by high temperatures from the photothermal source device (101).

18. A photothermal device arrangement as claimed in claim 1, further comprising light transmitting heat insulation (1020) installed on a surface of the photothermal source device (101) and the photovoltaic device (102) for protecting the photovoltaic device (102) from damage or decreased performance caused by high temperatures from the photothermal source device (101).

19. A photothermal device arrangement as claimed in claim 1, wherein a heat radiator (1013) installed on the photothermal source device (101) is included in the fluid pumping device assembly (103).

20. A photothermal device arrangement as claimed in claim 1, wherein the fluid pumping device assembly (103) includes a housing installed on the photothermal source device (101).

21. A photothermal device arrangement as claimed in claim 1, wherein the fluid pumping device assembly (103) is separate from the photothermal source device (101).

22. A photothermal device arrangement as claimed in claim 1, wherein the fluid is a gas and the fluid pumping device assembly (103) pumps the gas in a predetermined direction.

23. A photothermal device arrangement as claimed in claim 1, wherein the fluid pumping device assembly (103) includes at least one of an electromagnetically-vibrated fluid pump, a rotation-type fluid pump, a piston-type fluid pump, and a blade-type fluid pump.

24. A photothermal device arrangement as claimed in claim 1, wherein the photothermal source device (101) heats the fluid to a high temperature as it is pumped through the photothermal source device (101) by the fluid pumping device assembly (103) to remove the generated thermal energy from the photothermal source device (101).

25. A photothermal device arrangement as claimed in claim 24, wherein the photothermal source device (101) includes one of an electrically-driven LED lamp, a gas lamp, a mercury lamp an incandescent bulb, and a device that generates light by combustion.

26. A photothermal device arrangement as claimed in claim 1, wherein the fluid is initially at a relatively low temperature and is pumped to a part or all of the photothermal source device (101), a heat radiator (1013) of the photothermal source device (101), and/or a space heated by the photothermal source device (101) so as to lower a temperature of the photothermal source device (101) and/or the space heated by the photothermal source device (101).

27. A photothermal device arrangement as claimed in claim 1, wherein the fluid that has been heated by passing through the photothermal source device (101) is pumped through at least a part of the photothermal source device (101), a heat radiator (1013) of the photothermal source device (101), and/or a space around the photothermal source device (101) to prevent the part of the photothermal source device (101) and the space around the photothermal source device (101) from becoming excessively cold.

28. A photothermal device arrangement as claimed in claim 1, wherein the photothermal source device (101) is one of a fuel combustion heater, a combustion-type photothermal source, and an electric heater, the fluid carrying away the thermal energy from the photothermal source device (101).

29. A photothermal device arrangement as claimed in claim 1, wherein the photothermal source device (101) is a combustion device and the fluid is a gas introduced from an exterior of the photothermal fluid pumping device.

\* \* \* \* \*